United States Patent
Di Palmi et al.

(10) Patent No.: US 7,890,297 B2
(45) Date of Patent: *Feb. 15, 2011

(54) PREDICTIVE MONITORING METHOD AND SYSTEM

(75) Inventors: Andrea Di Palmi, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 110 days.

This patent is subject to a terminal disclaimer.

(21) Appl. No.: 12/337,612

(22) Filed: Dec. 17, 2008

(65) Prior Publication Data

US 2009/0094183 A1  Apr. 9, 2009

Related U.S. Application Data

(63) Continuation of application No. 11/746,993, filed on May 10, 2007, now Pat. No. 7,483,815.

(51) Int. Cl.
 *G06F 11/30* (2006.01)

(52) U.S. Cl. .............. 702/182; 702/179; 702/186; 702/189; 714/48; 709/224

(58) Field of Classification Search ............. 702/182, 702/179, 189, 186; 714/48; 709/224
See application file for complete search history.

(56) References Cited

U.S. PATENT DOCUMENTS 6,726,767 B1  4/2004  Marrs et al.
7,103,509 B2  9/2006  Shah et al.

*Primary Examiner*—Drew A Dunn
*Assistant Examiner*—Hien X Vo
(74) *Attorney, Agent, or Firm*—Yee & Associates, P.C.; Jeffrey S. LaBaw

(57) ABSTRACT

A method for monitoring a data processing system is proposed. The method involves the measuring of state parameters of the system. Indicators of the performance of the system are then inferred from the state parameters by applying fuzzy-logic rules. The proposed solution is based on the idea of estimating the expected value of each performance indicator in the future from a set of corresponding samples. In this way, it is possible to predict the evolution of the system and then detect any problem in advance.

9 Claims, 5 Drawing Sheets

PREDICTIVE MONITORING METHOD AND SYSTEM

This application is a continuation of application Ser. No. 11/746,993, filed May 10, 2007, status, allowed, which in turn is a continuation of application Ser. No. 11/221,548, filed Sep. 8, 2005, status issued.

TECHNICAL FIELD

The present invention relates to the data processing field. More specifically, the present invention relates to a method of monitoring a data processing system. The invention further relates to a computer program for performing the method, and to a product embodying the program. Moreover, the invention also relates to a corresponding data processing system.

BACKGROUND ART

Applications for monitoring data processing systems play a key role in their management. For example, those applications are used to detect any critical condition in the system (so that appropriate corrective actions can be taken in an attempt to remedy the situation). Typically, the essential information relating to the critical conditions being detected is logged; the information is then available for off-line analysis through data warehousing techniques.

For this purpose, predefined state parameters of the system (such as a processing power consumption, a memory space usage, a bandwidth occupation, and the like) are measured periodically. The information so obtained is then interpreted according to a decision tree. The decision tree includes intermediate nodes each one defining a test based on the state parameters; the branches descending from the intermediate node correspond to the possible outcomes of the test. Each leaf node identifies the condition of the system (correct or critical) Typically, the tests are based on comparisons between one or more state parameters and corresponding threshold values. The threshold values are defined statically by an administrator of the system; for example, the occurrence of a low response time of the system can be inferred when the processing power consumption exceeds 70% and at the same time the memory space usage exceeds 60%.

A drawback of the solution described above is that the definition of the threshold values is strongly dependent on the characteristics of the system to be monitored. Therefore, this process implies a deep knowledge of the system; in any case, the results are always dependent on the skill of the administrator. Moreover, the threshold values cannot be defined in general terms for every system. For example, a processing power consumption lower than 70% can be acceptable in most practical situations; however, a far lower threshold value (for example, 50%) could be necessary in critical applications. Likewise, the behavior of the system usually changes at run-time, so that the threshold values that have been set at the beginning can be no longer valid later on. As a consequence, the threshold values must be selected according to the worst case, thereby increasing the detection of (alleged) critical conditions.

In any case, the available solutions can only be used to recover the correct operation of the system. Indeed, the decision tree detects any critical condition when it has already occurred and the system cannot continue working properly. Therefore, those solutions are completely ineffective in preventing the occurrence of problems in the system.

A possible solution could be that of lowering the threshold values; in this manner, it is possible to reduce the risk of experiencing any malfunctioning in the system (since the critical conditions are detected in advance). However, this approach has a deleterious effect on the operation of the system; indeed, the use of lower threshold values involves a dramatic increase of the detection of (alleged) critical conditions.

An additional drawback is due to the fact that the corrective actions that are taken in response to the detection of the critical conditions can be ineffective. Particularly, in many situations it is not possible to ascertain whether the critical condition detected by the monitoring application actually requires any corrective action. A typical example is that of a transient phenomenon, wherein the system automatically recovers to its correct operation; in this case, it would be preferred to take no correction action (since any intervention on the system could worsen the situation).

SUMMARY OF THE INVENTION

The present invention proposes a solution, which is based on the idea of estimating an evolution of the system to be monitored; in this way, any critical condition of the system is detected in advance according to the result of the estimation.

Particularly, an aspect of the present invention provides a method of monitoring a data processing system The method starts with the step of providing a set of samples of one or more performance indicators of the system An expected value of each performance indicator is estimated through a predictive algorithm based on the corresponding set of samples. A critical condition of the system is then detected according to the expected values.

The proposed solution provides a preventive approach. In other words, the method tries predicting the future evolution of the system so as to detect any possible critical condition in advance. In this way, it is possible to take corrective actions in order to prevent the actual occurrence of the problems.

This result strongly improves the reliability of the system; therefore, the resource consumption for data logging and data warehousing can be dramatically reduced.

In addition, the devised solution is very effective. Indeed, the corrective actions can now be taken only when the behavior of the system indicates that a true critical condition is very likely to occur; this allows discarding dummy situations that do not require any corrective actions (for example, in transient phenomena).

The above-mentioned advantages are clearly perceived in high dynamic environments, wherein the conditions of the system to be monitored change continually (even if other applications are not contemplated).

The preferred embodiments of the invention described in the following offer further advantages.

Particularly, the set of samples consists of a sequence of samples in temporal succession. Each expected value is estimated by applying a linear predictive filter to the sequence of samples according to a corresponding sequence of weights.

This algorithm is very simple, but at the same effective.

As a further improvement, the sequence of weights is dynamically updated according to a comparison between one or more samples of the set and the corresponding expected values.

The above-mentioned feature reduces the accuracy of the estimation; however, this is more than compensated for by the simplicity of the implementation.

In another embodiment, the sets of samples of the performance indicators are provided by measuring a current value of a plurality of state parameters of the system. A current value of the performance indicators is determined from the current values of the state parameters; those current values of the performance indicators are then stored.

As a consequence, the estimation is performed on aggregated values (instead of on the raw state parameters); therefore, the computational complexity of the method is strongly reduced.

A way to further improve the solution is to convert the current value of each state parameter into a corresponding input fuzzy variable. One or more fuzzy-logic rules are then applied; those rules define one or more output fuzzy variables as a function of the input fuzzy variables (with each output fuzzy variable that is associated with a corresponding performance indicator). Each output fuzzy variable is now converted into the current value of the corresponding performance indicator.

This feature provides an adaptive approach; in other words, the method dynamically learns the contour conditions and modifies its behavior accordingly. Particularly, the proposed solution is independent of the characteristics of the system to be monitored; as a consequence, the tuning of the method is strongly simplified. Moreover, the same solution can be deployed to multiple systems (irrespective of their characteristics); at the same time, the method self-adapts to changing conditions of the systems.

Typically, each input fuzzy logic variable is represented by a plurality of properties (each one having a corresponding distribution of confidence). In a preferred implementation, the distributions of each input fuzzy logic variable are updated dynamically according to statistical information of the corresponding state parameter.

In this way, the inference rules can be defined in general terms (with the properties of the fuzzy variables that have different meanings on each system).

Advantageously, each performance indicator is converted into a logic value (indicative of an occurrence of the critical condition) according to a comparison between the performance indicator and a threshold value.

As a result, the proposed solution can be plugged into a standard monitoring application without requiring any change.

A further aspect of the present invention provides a computer program for performing the above-described method.

A still further aspect of the invention provides a program product embodying this computer program.

Moreover, another aspect of the invention provides a corresponding data processing system.

The novel features believed to be characteristic of this invention are set forth in the appended claims. The invention itself, however, as well as these and other related objects and advantages thereof, will be best understood by reference to the following detailed description to he read in conjunction with the accompanying drawings.

DETAILED DESCRIPTION OF THE PREFERRED EMBODIMENTS

Figure 1:
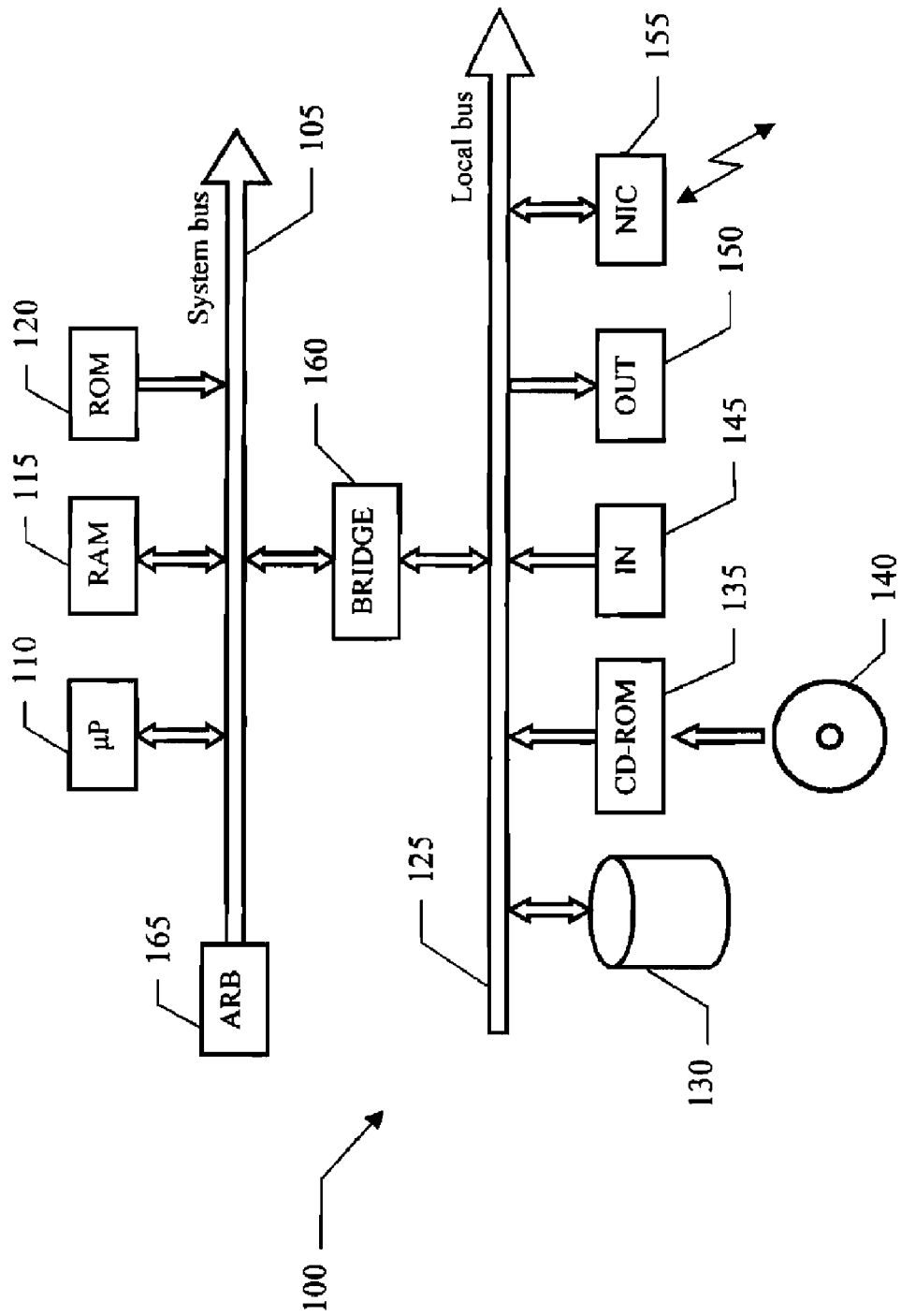
FIG. 1 is a schematic block diagram of a data processing system in which the method of the invention is applicable.

With reference in particular to FIG. 1, a computer 100 that can be used for implementing the method of the invention is illustrated. The computer 100 is formed by several units that are connected in parallel to a system bus 105. In detail, one or more microprocessors (③P) 110 control operation of the computer 100; a RAM 115 is directly used as a working memory by the microprocessors 110, and a ROM 120 stores basic code for a bootstrap of the computer 100. Peripheral units are clustered around a local bus 125 (by means of respective interfaces). Particularly, a mass memory consists of a hard-disk 130 and a drive 135 for reading CD-ROMs 140. Moreover, the computer 100 includes input devices 145 (for example, a keyboard and a mouse), and output devices 150 (for example, a monitor and a printer). A Network Interface Card (NIC) 155 is used to connect the computer 150 to the network. A bridge unit 160 interfaces the system bus 105 with the local bus 125. Each microprocessor 110 and the bridge unit 160 can operate as master agents requesting an access to the system bus 105 for transmitting information. An arbiter 165 manages the granting of the access with mutual exclusion to the system bus 105.

Typically, the solution of the invention is used to monitor multiple endpoints in a data processing system with distributed architecture (each endpoint consisting of the above-described computer 100). In this case, the same monitoring application is deployed to each endpoint so as to control its operation directly; the results of the monitoring are usually collected by a central server periodically (for example, every night).

Similar considerations apply if the computer has a different structure, includes equivalent units, or consists of other data processing entities (such as PDAS, mobile phones, and the like). Moreover, the solution of the invention is also suitable to be used in a system wherein the endpoints are controlled centrally by the server; in any case, the application of the proposed. solution in a stand-alone computer (or more generally in any other data processing system) is not excluded.

Figure 2A:
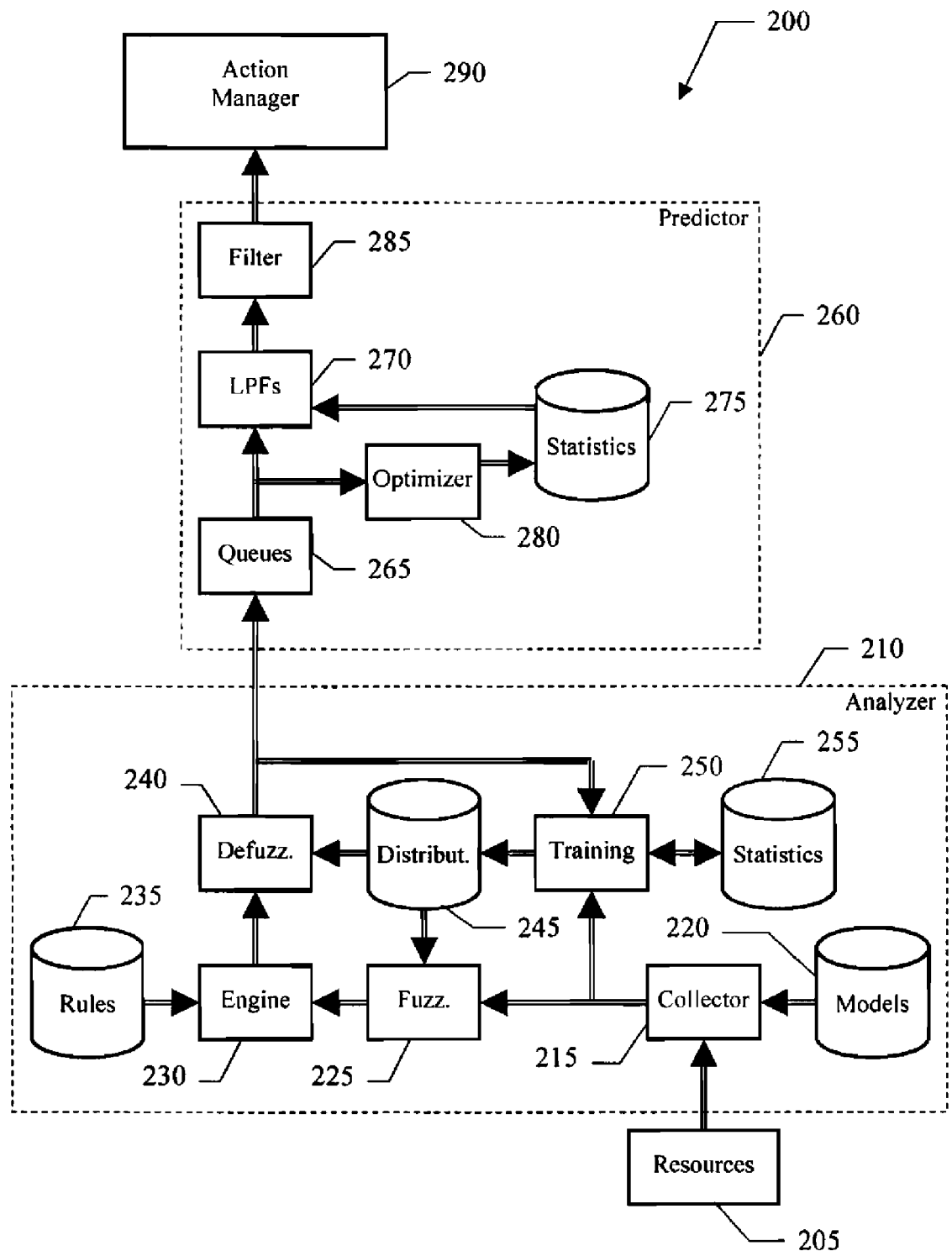
FIG. 2a depicts the main software components that can be used for practicing the method.

Considering now FIG. 2a, the main software components that can be used to practice the method of the invention are illustrated. The information (programs and data) is typically stored on the hard-disk and loaded (at least partially) into the working memory when the programs are running. The programs are initially installed onto the hard-disk from CD-ROMs.

Particularly, an agent 200 is used to monitor relevant hardware and/or software resources 205 of the above-described computer. For this purpose, the monitoring agent 200 includes an analyzer 210, which periodically measures state parameters of the computer. More in detail, the state parameters are collected by a module 215 according to predefined resource models 220. Each resource model 220 identifies the key state parameters that define correlated resources 205 in a specific context; for example, the resource model 220 involves the measuring of a processing power consumption, a memory space usage, a bandwidth occupation, and a number of concurrent users for controlling the response time of a web application.

The collected state parameters are supplied to a module 225, which converts them into fuzzy logic variables. Fuzzy logic is an approach to computing based on degrees of truth, or confidences (rather than the usual true and false values of the Boolean logic). For this purpose, each fuzzy variable is associated with a set of linguistic properties (typically in an odd number), which properties define qualitative levels of the fuzzy variable (such as very low, low, normal, high and very high). Each property is defined by the confidence that the fuzzy variable has this property; the confidences (ranging from 0 for false to 1 for true) are very similar to probabilities, except that they do not need to sum to one. For example, in the above-mentioned case the fuzzy variable can be 0.05 very low, 0.12 low, 0.65 normal, 0.35 high, and 0.22 very high. The confidences (of generic fuzzy variables x and y) can be combined with standard operators, such as:

NOT(x)=1−x x AND Y=Minimum(x,y)

x OR Y=Maximum(x,y)

Figure 2B:
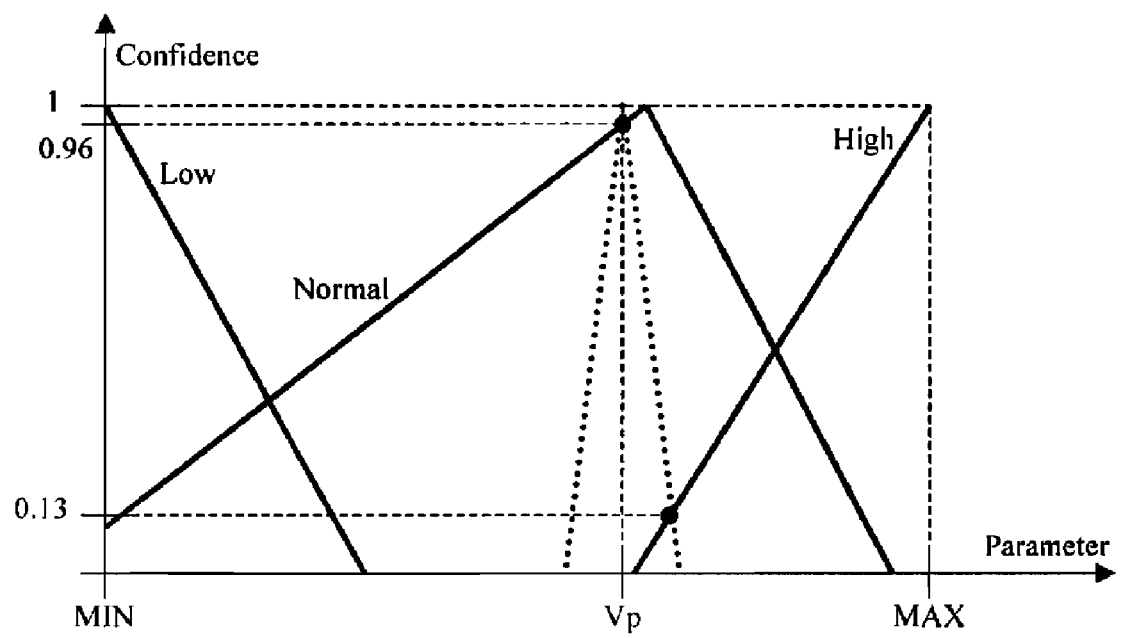
FIGS. 2b-2c illustrate examples of conversion from a state parameter to an input fuzzy variable and from an output fuzzy variable to a performance indicator, respectively.

In the specific application of the monitoring agent 200, each state parameter is preferably associated with a fuzzy variable having three properties (low, normal and high). As shown in FIG. 2b, the distributions of the confidences of those properties are typically defined by triangles; the triangles span a so-called universe of discourse, which defines the range of admitted values for the state parameter (from a minimum value MIN to a maximum value MAX). The confidences of the properties are obtained from the value of the state parameter. For this purpose, a comparison triangle (having a height equal to 1 and a predefined amplitude, for example, equal to 5-15% the universe of discourse) is centered on the value of the state parameter. The confidence of each property consists of the highest ordinate of the points of intersection between the triangle of the corresponding distribution and the comparison triangle (with the confidence that is set to 0 when no point of intersection is available). In the example at issue, a value Vp of the state parameter provides a corresponding fuzzy variable that is 0.0 Low, 0.96 Normal and 0.13 High.

Returning to FIG. 2a, the fuzzy variables determined by the module 225 (hereinafter called "fuzzifier") are supplied to an engine 230. The engine 230 accesses a repository 235 of inference rules. Each inference rule 235 propagates the confidences of conditions defined by input fuzzy variables to a conclusion defined by an output fuzzy variable; in the example at issue, the input fuzzy variables represent the state parameters, while the output fuzzy variables represent indicators of the performance of the computer (for example, relating to its workload). More in detail, the inference rules 235 are basically if-then relations; each relation defines an expression based on the properties of input fuzzy variables, which evaluation provides the confidence of a property of an output fuzzy variable. For example, denoting with Pb and Pu the input fuzzy variables associated with the bandwidth occupation and the concurrent users, respectively, and with Iw the output fuzzy variable associated with the workload, it is possible to define the following inference rule:

IF (Pb is High OR Pu is High) THEN Iw is High (meaning that the workload of the computer is high when either the bandwidth occupation or the concurrent users are high). Assuming that Pb is 0.22 High and Pu is 0.75 High, we have that Iw is High with a confidence equal to Maximum(0.22, 0.75)=0.75.

Figure 2C:
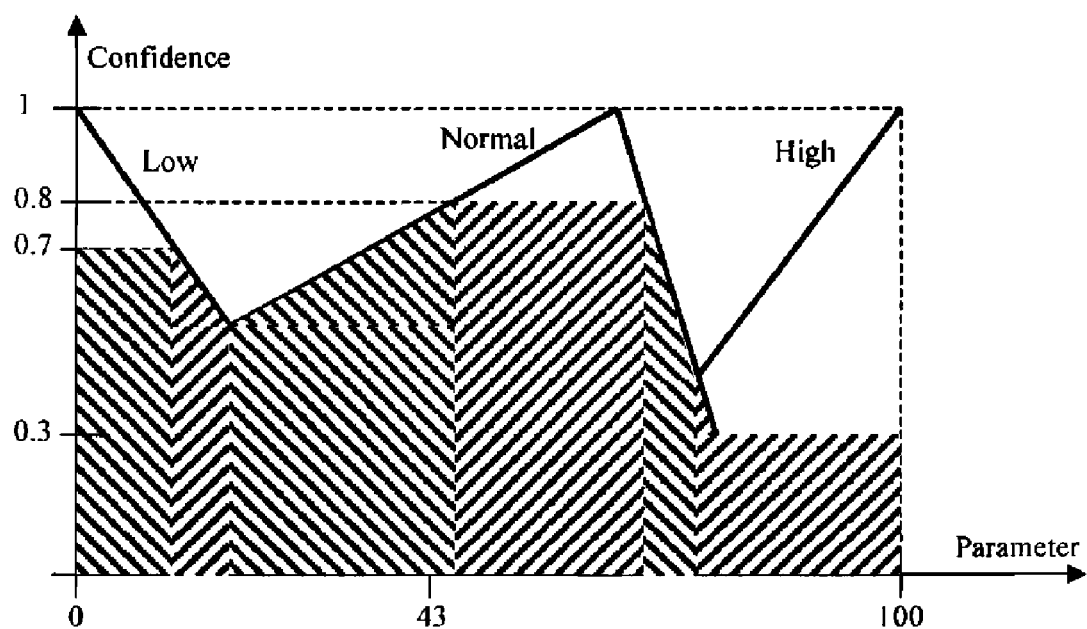

The output fuzzy variables so obtained are supplied by the engine 230 to a module 240 (hereinafter called "defuzzifier"), which converts them into the corresponding (crisp) performance indicators; preferably, the performance indicators are normalized to range from a minimum value (for example, 0) to a maximum value (for example, 100). As shown in FIG. 2c, this process is preferably carried out using the center of gravity algorithm. Particularly, each distribution is clipped according to the corresponding confidence (so as to define a trapezoid in the example at issue). The abscissa of the center of gravity of the total area so obtained is then calculated. For this purpose, the area is partitioned into basic blocks at each (relative) minimum/maximum; denoting with $A_k$ the extension of each k-th basic block and with $M_k$ the corresponding arm (i.e., the distance of the central point in its base from the origin), the position of the center of gravity Cg is given by the formula:

$$Cg = \frac{\sum A_k \cdot M_k}{\sum A_k}$$

This choice strongly reduces the computation complexity, at the same time maintaining an acceptable degree of approximation. For example, let us suppose that the output fuzzy variable is 0.7 Low, 0.8 Normal and 0.3 High; the application of the above-mentioned algorithm to the distributions shown in the figure provides a performance indicator equal to 43.

Returning to FIG. 2a, the distributions of the input and output fuzzy variables are stored into a repository 245, which is accessed by both the fuzzifier 225 and the defuzzifier 240. The distributions of the (input/output) fuzzy variables are dynamically updated by a training module 250. For this purpose, the training module 250 gathers the state parameters from the collector 215 and the performance indicators from the defuzzifier 240; those values are stored into a table 255, together with corresponding running statistics (such as the mean value and the normalized variance).

The current values of the performance indicators so obtained are provided to a predictor 260, which estimates their expected values in the future. More in detail, for each performance indicator (generically denoted with I) a set of samples of its current values (taken at s successive measuring cycles preceding the current one, such as 10-20) are buffered into a corresponding queue 265. The samples stored in the queue 265 are input to a corresponding Linear Predictive Filter (LPF) 270, which estimates the expected performance indicator (denoted with Î) from a linear combination of its samples. The linear combination is typically implemented as a weighted sum of the samples. Denoting with n the current cycle, the expected performance indicator at the next cycle Î(n+1) will be:

$$\hat{I}(n+1) = \sum_{0 \ldots s-1} w(i) \, \theta(n-i)$$

wherein w(0), w(1) ... w(s−1) are the weights associated with the samples I(n), I(n−1) ... I(n−s+1), respectively. Likewise, the expected performance indicator at a still next cycle Î(n+2) is estimated according to an updated set of samples, obtained by adding the expected performance indicator Î(n+1) and discarding the oldest one. The same operation can be reiterated, so as to estimate the expected performance indicator Î(n+p), p cycles ahead from the current one. Of course, the extension of the prediction reduces its accuracy since the expected performance indicator is based more and more on values that are themselves estimated (instead of being true samples); a good compromise between the opposed requirements of a long prediction and a high accuracy can be achieved by setting the parameter p to a value in the range from 1 to 15 (for example, 8).

The weights w are stored into a table 275 (which is accessed by the predictive filter 270). The best results of the predictive filter 270 are obtained by setting the weights w according to the auto-correlation function of the samples; however, this would require the theoretical knowledge of an infinite sequence of samples. Therefore, in a preferred embodiment of the invention the predictive filter 270 is implemented with an adaptive structure; in this case, the weights w are calculated dynamically in an iterative manner by an optimizer 280 (from an initial set of values).

For this purpose, an error e between the true performance indicator I and its corresponding estimated value Î (i.e., e=I−Î) is used as a feedback to correct the weights w. Preferably, the optimizer 280 exploits the steepest descent algorithm to determine the values of the weights w that minimize the mean square error. For example, starting from each weight of the current cycle n, denoted with $w^{(n)}$, it would be possible to calculate the corresponding weight $w^{(n+p)}$ p cycles ahead by applying the following formula:

$$w^{(n+p)} = w^{(n)} - ③ \cdot \mathbf{\hat{g}}(n+p)$$

wherein ③ is a parameter defining the speed of convergence of the algorithm, and $\mathbf{\hat{g}}(n+p)$ is the gradient of the mean square error e(n+p) relating to the expected performance indicator Î(n+p) that is estimated at the current cycle n. By solving the above-mentioned equation, we have:

$$w^{(n+p)} = w^{(n)} + 2③ \cdot e(n+p) \cdot I(n)$$

However, the above-mentioned formula would require the availability of the error e(n+p) at the time of computation (current cycle n). Therefore, in a preferred embodiment of the invention, the weight $w^{(n+p)}$ is calculated by applying the following approximated formula:

$$w^{(n+p)} = w^{(n)} + \frac{\bullet e(n)/(n-p)}{\varphi(n-p)\vartheta}$$

The expected performance indicators Î are then supplied to a threshold filter 285, which converts them into corresponding problem flags Fp. Each problem flag Fp consists of a logic value (false or true) that indicates the occurrence of a corresponding critical condition in the computer (when asserted). Particularly, the filter 285 sets the problem flag Fp to false when the corresponding expected performance indicator Î is lower than a predefined threshold value (for example, 0.7); otherwise, the filter 285 sets the problem flag Fp to true.

The problem flags Fp are then provided to a standard action manager 290. The action manager 290 performs predefined actions in response to the detection of any critical condition in the computer (in an attempt to recover its correct operation); in addition or in alternative, the action manager 290 can send a notification to an administrator of the system.

Similar considerations apply if the programs and the corresponding data are structured in another manner, or if different modules or functions are provided. However, the solution of the invention is also suitable to be implemented with different state parameters, or with fuzzy variables having different and/or additional properties (for example, very high and extremely high); likewise, in more sophisticated implementations the distributions have other shapes, or the operators applied to the input fuzzy variables are resolved in a different way. Moreover, the predictor can estimate the expected performance indicators for a different number of cycles ahead (down to a single one), or the threshold can be set to a different value (even customized for each performance indicator).

Figure 3A:
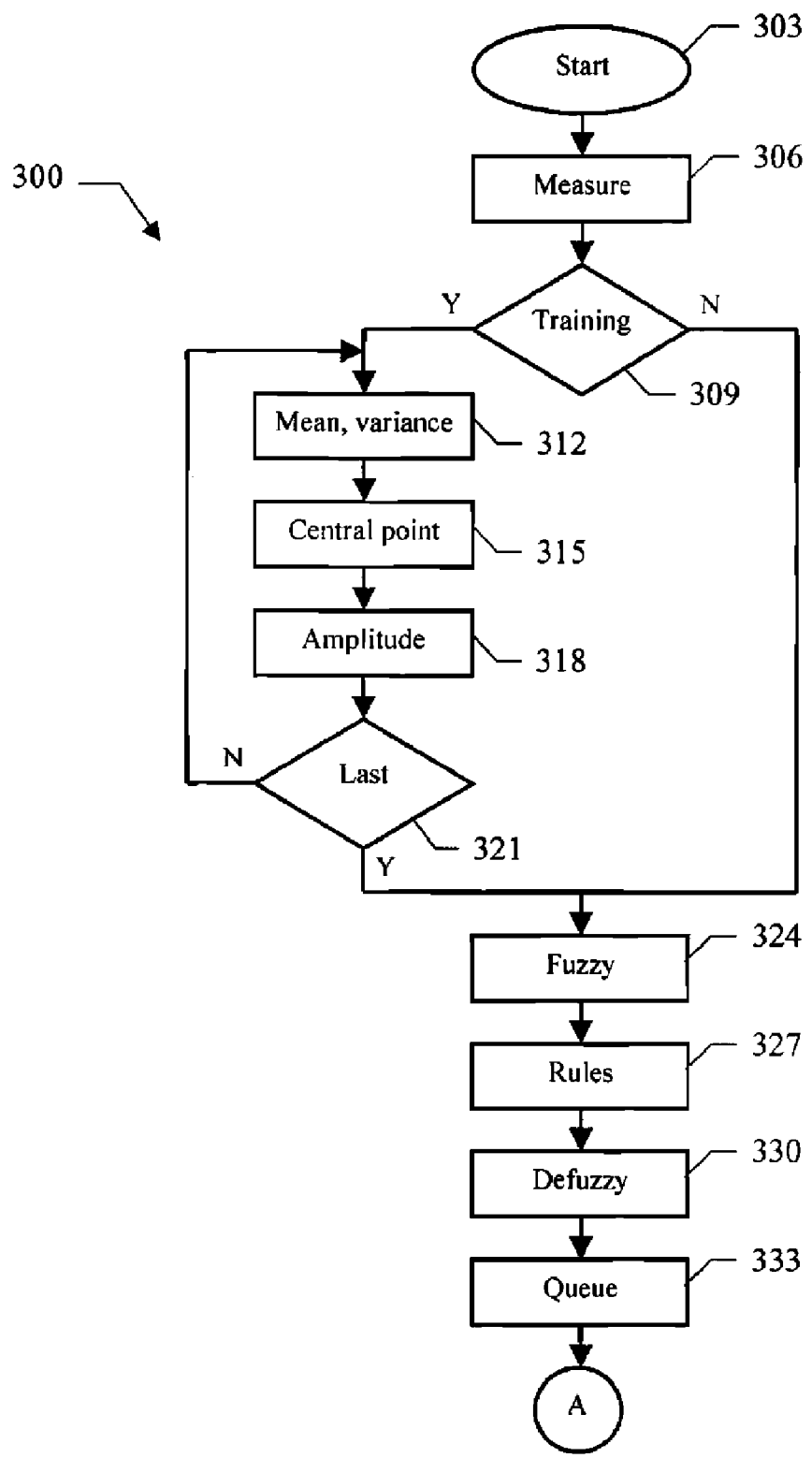
FIGS. 3a-3b show a flow chart describing the logic of an illustrative implementation of the method.
Figure 3B:
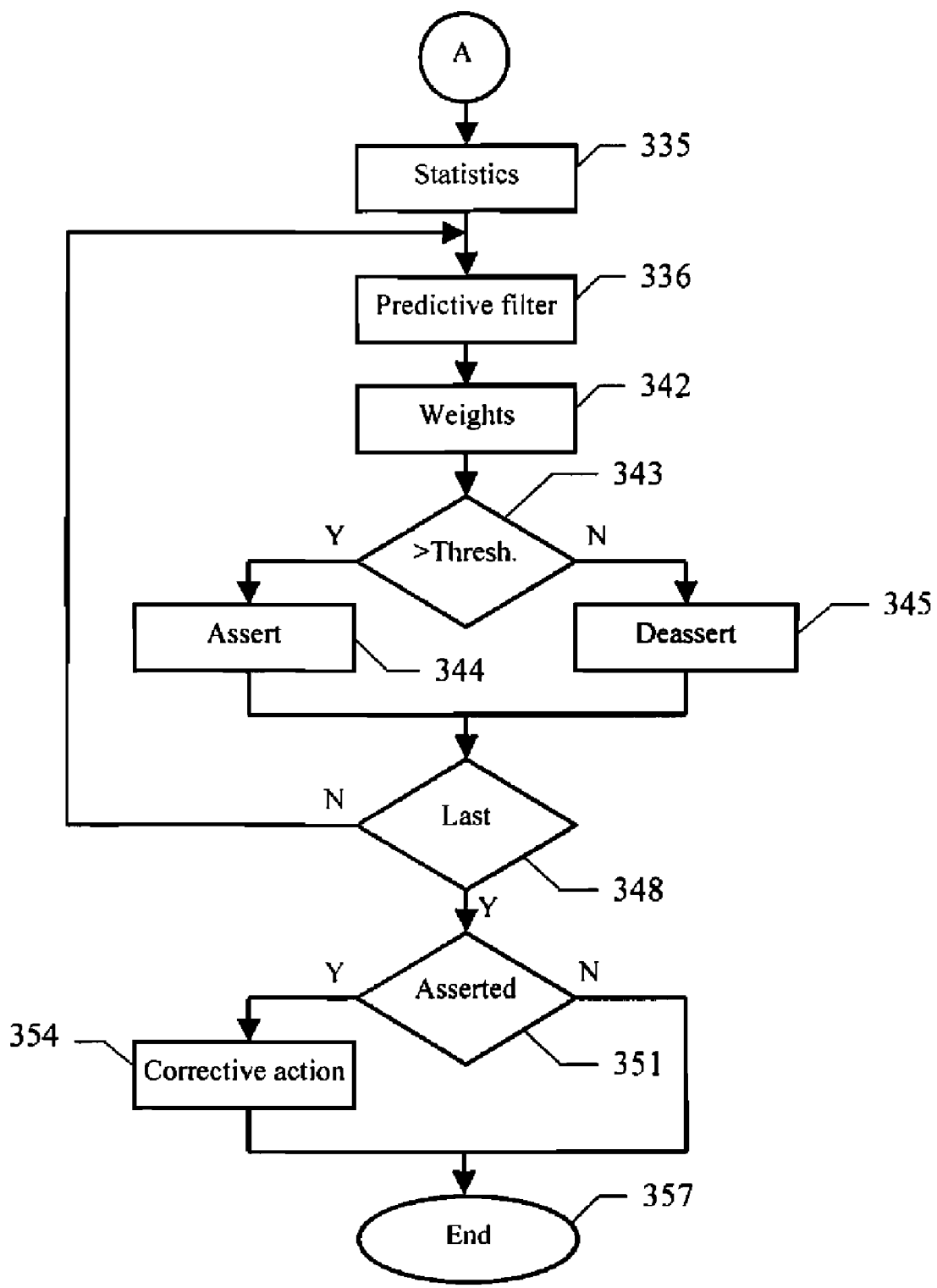

Considering now FIGS. 3a-3b, the logic flow of a monitoring process according to an embodiment of the invention is represented with a method 300; the method is executed continually at scheduled intervals (for example, every hour). The method begins at the start block 303, and then passes to block 306 wherein the desired state parameters are measured.

The method verifies at block 309 whether a training process for defining the distributions of the fuzzy variables must be run. If so, the blocks 312-321 are executed, and the method then passes to block 324; conversely, the flow of activity descends into block 324 directly. Typically, the training process is always active during a startup phase of the computer for a suitable period until the distributions of the fuzzy variables reach a steady condition (staring from a default configuration wherein the distributions are defined by triangles having identical amplitudes and uniformly spaced throughout the corresponding universe of discourse); then, the training process is run periodically (for example, every night) to account for intervening modifications of the environment. In this way, the training process is active only for short periods; therefore, this process (being quite resource consuming) does not adversely affect the performance of the monitored computer.

Considering now block 312 (training process), the mean value m and the normalized variance ⑨ of the logged values of each state parameter and performance indicator (generically denoted as crisp variables) are calculated.

For each fuzzy variable, the central points $X_j$ of the triangles defining the distributions of the corresponding properties (with j=0...2 in the example at issue) are defined at block 315. Particularly, the central point $X_0$ of the first property (low) and the central point $X_2$ of the last property (high) is set to the minimum value and to the maximum value, respectively, of the corresponding crisp variable; the central point $X_1$ of the remaining property (normal) is instead set to the mean value m of the crisp variable. The algorithm can be readily extended to situations wherein the number of properties is higher; in this case, the central point $X_j$ of any other property is calculated by the formula:

$$x_j = \frac{(x_{j+1} - x_{j-1})}{2 \cdot \sigma}$$

Continuing to block 318, the amplitude $A_j$ of the triangles defining the distributions of the corresponding properties are then defined as:

$$A_j = \frac{(x_j - x_{j-1})}{2(\sigma+1)}$$

A test is now made at block 321 to determine whether all the crisp variables (state parameters and performance indicators) have been processed. If not, the method returns to block 312 to repeat the same operations for a next fuzzy variable. Conversely, the flow of activity descends into block 324.

Considering now block 324, the state parameters are converted into the corresponding input fuzzy variables. The method proceeds to block 327, wherein the output fuzzy variables (associated with the performance indicators) are evaluated by applying the inference rules. The output fuzzy variables so obtained are then defuzzed at block 330, in order to provide the corresponding performance indicators. Proceeding to block 333, each performance indicator so obtained is inserted into the corresponding queue (removing the oldest value). At the same time, both the state parameters and the performance indicators are logged into the statistic repository at block 335.

A loop is then performed for each performance indicator (starting from the first one); the loop begins at block 336, wherein the corresponding s samples in the queue are routed to the associated predictive filter, so as to estimate the expected performance indicator $\hat{I}(n+p)$ p cycles ahead. Continuing to block 342, the weights $w^{(n+p)}$ for p cycles ahead are calculated from the available information. The expected performance indicator $\hat{I}(n+p)$ is then compared with the corresponding threshold value at block 343. If the expected performance indicator $\hat{I}(n+p)$ exceeds the threshold value, the associated problem flag Fp is asserted at block 344; conversely, the problem flag Fp is deasserted at block 345. In both cases, the method continues to block 348, wherein a test is made to determine whether all the performance indicators have been processed. If not, the method returns to block 336 to repeat the same operations for a next performance indicator. Conversely, the flow of activity descends into block 351.

Considering now block 351, if one or more problem flags Fp are asserted (to denote the occurrence of the corresponding critical conditions), the method passes to block 354; in this case, predefined correction actions are performed to recover the correct operation of the computer. The method then ends at the final block 357; the same point is also reached from block 351 directly when no problem flag Fp is asserted.

Similar considerations apply if the method includes equivalent or additional steps. In any case, the solution of the invention is also suitable to be carried out with the training process that is executed with another policy (for example, whenever a significant change in the corresponding statistics occurs); likewise, the central points and/or the amplitudes of the distributions can be calculated with different formulas.

Although the invention has been described above with a certain degree of particularity with reference to preferred embodiment(s) thereof, it should be understood that various changes in the form and details as well as other embodiments are possible. Particularly, it is expressly intended that all combinations of elements and/or method steps that substantially perform the same function in the same way to achieve the same results are within the scope of the invention.

For example, the method can be based on other performance indicators of the system, or any number of samples (down to a single one) can be provided for each performance indicator.

Moreover, the linear predictive filters can be implemented in a different way.

Likewise, the weights can be updated by applying other formulas.

Alternatively, the state parameters are converted into the input fuzzy variables and/or the output fuzzy variables are converted into the performance indicators in a different way (for example, calculating the center of gravity exactly with integrals or applying other techniques, such as the mean of maximum method). Likewise, the inference rules can be applied in another manner (for example, by combining the distributions of the input fuzzy variable to obtain the corresponding distributions of the output fuzzy variables).

Similar considerations apply if the distributions of the fuzzy variables are updated according to other statistical information (for example, of higher order).

Moreover, the expected performance indicators can be converted into logic values with more sophisticated algorithms (for example, changing the threshold values dynamically).

It will be also apparent to those skilled in the art that the additional features providing further advantages are not essential for carrying out the invention, and may be omitted or replaced with different features.

For example, filters of higher order or of the Kalman type can be used to estimate the expected performance indicators.

In any case, the use of weights that are statically defined (for example, according to the auto-correlation function of the samples) is not excluded.

Moreover, the application of the estimation to the state parameters directly (instead of to the performance indicators) in contemplated and within the scope of the invention The performance indicators are also suitable to be determined using other techniques (for example, based on neural networks); however, the solution of the invention leads itself to be implemented even applying the estimation to generic performance indicators that are collected in a standard way.

Alternatively, the distributions of the fuzzy variables can be determined with another technique (even statically).

In any case, the use of the expected performance indicators directly (without any conversion into logic values) is envisaged.

Moreover, the programs can be distributed on any other computer readable medium (such as a DVD); alternatively, the programs are pre-loaded onto the hard-disk, are sent to the computer through the network, are broadcast, or more generally are provided in any other form directly loadable into the working memory of the computer. However, the method according to the present invention leads itself to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims

The invention claimed is:

1. A method of monitoring a data processing system including the steps of:
    providing a set of samples of at least one performance a first indicator of a performance of the data processing system,
    estimating an expected value of each performance the first indicator through a predictive algorithm based on the corresponding set of samples,
    detecting a critical condition of the data processing system according to the at least one expected value; and
    taking a corrective action to prevent an actual occurrence of a problem when the critical condition is detected;
    wherein the providing, the estimating, the detecting, and the taking steps are performed by the data processing system.

2. The method according to claim 1, wherein the set of samples consists of a sequence of samples in temporal succession, the step of estimating the expected value including:
    applying a linear predictive filter to the sequence of samples according to a corresponding sequence of weights.

3. The method according to claim 2, wherein the step of estimating the expected value further includes:
    dynamically updating the sequence of weights according to a comparison between at least one sample of the set and a corresponding expected value.

4. The method according to claim 1, wherein the step of providing the set of samples of the at least one performance first indicator of the performance of the data processing system includes:
    measuring a current value of a plurality of state parameters of the data processing system, determining a current value of the at least one performance first indicator from the current value of the plurality of state parameters, and storing the current value of the at least one performance first indicator.

5. The method according to claim 1, wherein the step of detecting the critical condition includes:

converting each performance the first indicator into a logic value indicative of an occurrence of the critical condition according to a comparison between the performance first indicator and a threshold value.

6. A computer program product in a non-transitory computer-readable medium and including program code means directly loadable into a working memory of a data processing system for performing the method of claim 1 when the computer program product is run on the data processing system.

7. A data processing system including a data processor, a memory coupled to the data processor, and program code which is operable, when loaded into the memory and executed by the data processor, to perform steps of providing a set of samples of at least one performance a first indicator of the data processing system by estimating an expected value of each performance the first indicator through a predictive algorithm based on the corresponding set of samples, and detecting a critical condition of the data processing system according to the at least one expected value.

8. A data processing system of claim 7, wherein the first indicator is at least one performance indicator of the data processing system, wherein the set of samples of the first indicator is a set of samples of the at least one performance indictor, and wherein the providing the set of samples of the at least one performance indicator includes:

measuring a current value of a plurality of state parameters of the data processing system, determining a current value of the at least one performance indicator from the current value of the plurality of state parameters, storing the current value of the at least one performance indicator, wherein the means for determining the current value of the at least one performance indicator includes:

converting the current value of each state parameter into a corresponding input fuzzy variable, applying at least one fuzzy-logic rule defining at least one output fuzzy variable as a function of the input fuzzy variables, each output fuzzy variable being associated with a corresponding performance indicator, and converting each output fuzzy variable into the current value of the corresponding performance indicator.

9. The data processing system according to claim 8, wherein each input fuzzy logic variable is represented by a plurality of properties each property having a corresponding distribution of confidence, the determining the current value of the at least one performance indicator further including:

dynamically updating the distributions of each input fuzzy logic variable according to statistical information of the corresponding state parameter.

* * * * *